(12) United States Patent
Usui et al.

(10) Patent No.: US 6,314,121 B1
(45) Date of Patent: Nov. 6, 2001

(54) SEMICONDUCTOR LASER-EXCITATION SOLID-STATE LASER DEVICE

(75) Inventors: Akaru Usui; Shinji Sato; Kyouko Fukumura, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/508,164

(22) PCT Filed: Dec. 15, 1997

(86) PCT No.: PCT/JP97/04612

§ 371 Date: Mar. 8, 2000

§ 102(e) Date: Mar. 8, 2000

(87) PCT Pub. No.: WO99/31772

PCT Pub. Date: Jun. 24, 1999

(51) Int. Cl.[7] ............................. H01S 3/0941; H01S 5/022
(52) U.S. Cl. .................................................. 372/75; 372/36
(58) Field of Search .................................. 372/70, 72, 75, 372/36

(56) References Cited

U.S. PATENT DOCUMENTS

| 5,226,052 | * | 7/1993 | Tanaha et al. | 372/36 |
| 5,438,580 | | 8/1995 | Patel et al. | 372/36 |
| 5,485,482 | * | 1/1996 | Selker et al. | 372/75 |
| 5,544,184 | | 8/1996 | Wolak et al. | 372/43 |
| 5,826,269 | | 10/1998 | Hussey | 707/10 |
| 5,907,571 | * | 5/1999 | Ogino et al. | 372/43 |
| 6,038,244 | * | 3/2000 | Usui et al. | 372/75 |

* cited by examiner

Primary Examiner—James W. Davie
(74) Attorney, Agent, or Firm—Sughrue, Mion, Zinn, Macpeak & Seas, PLLC (57) ABSTRACT

A sub-mount, an LD bar and a light guide duct are mounted on an LD package main body of a semiconductor laser, and an outgoing section of the LD bar is inserted into the light guide duct. A gold metallized insulating plate is fused on one side of the LD package main body, and the LD bar and the gold metallizing are wire-bonded. The light guide duct transmits the excitation light directly up to a laser medium, and a reflector surrounds the periphery of the laser medium. Upon flowing of a current from the LD package main body to the cathode electrode, the LD excitation light is emitted and the laser medium is excited, to thereby make laser oscillation possible. With the above structure, there is provided an LD excitation solid-state laser device which is easy in assembling, low in the costs, high in efficiency and high in reliability.

8 Claims, 6 Drawing Sheets

FIG. 12

SEMICONDUCTOR LASER-EXCITATION SOLID-STATE LASER DEVICE

TECHNICAL FIELD

The present invention relates to a semiconductor excitation solid-state laser device which uses a light guide duct in order to guide an excitation light of a semiconductor laser (hereinafter referred to as "LD") to a solid-state laser medium, thereby making it possible to effectively transmit the excitation light.

BACKGROUND ART

Figure 9:
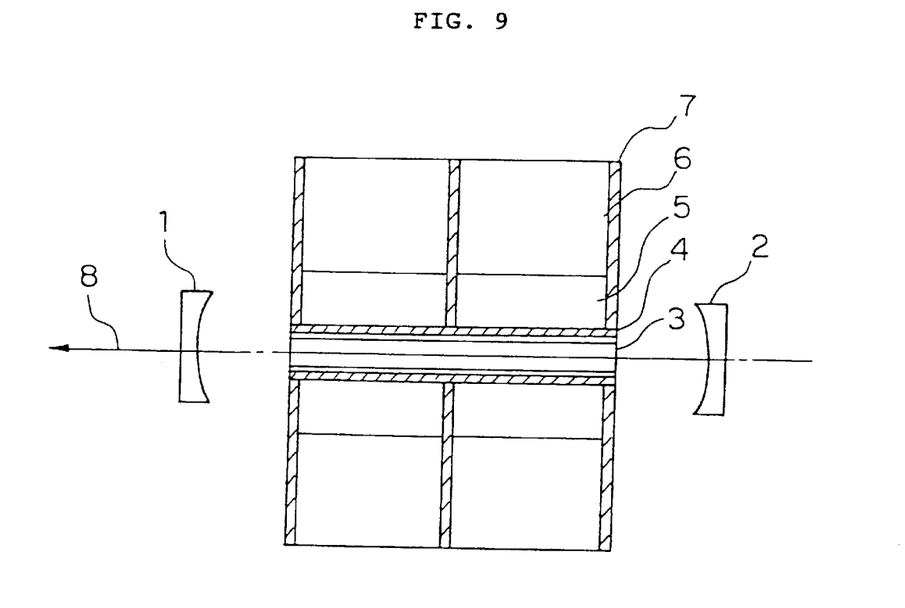
FIG. 9 is a structural diagram showing a conventional LD excitation solid-state laser oscillator.

FIG. 9 is a structural diagram showing a conventional LD excitation solid-state laser oscillator using an LD laser beam as an excitation light. Referring to FIG. 9, reference numeral 1 denotes a partial reflecting mirror that partially transmits a laser beam 8, and 2 is a total reflecting mirror which is opposed to the partial reflecting mirror 1 through a laser medium 3 and totally reflects the laser beam 8. Reference numeral 4 denotes a flow tube for cooling the laser medium 3 with water, and cooling water that cools the laser medium 3 flows in a gap between the flow tube 4 and the laser medium 3. Reference numeral 5 denotes a guide plate and transmits the excitation light radiated from an LD package 6 up to the laser medium 3. Reference numeral 7 denotes a reflector which shuts up the excitation light transmitted through the guide plate 5 therein and superimposedly reflects the excitation light within the reflector 7 to excite the laser medium 3.

Figure 10:
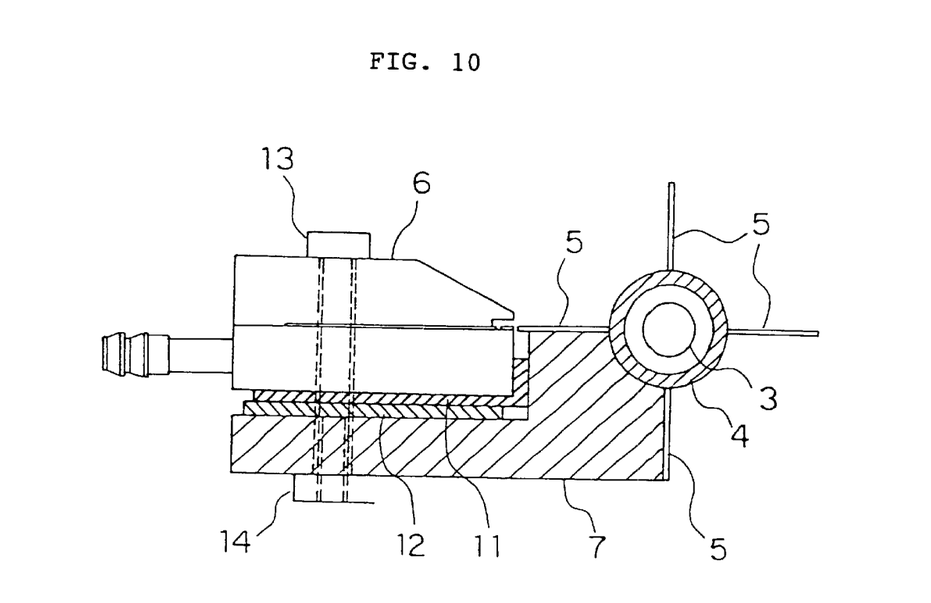
FIG. 10 is a structural cross-sectional view showing a conventional LD excitation solid-state laser medium section.

FIG. 10 is a longitudinal cross-sectional view of an excitation section made up of the LD package 6 shown in FIG. 9 and shows the structure in which the laser medium 3 is excited. Reference numeral 6 denotes the LD package that emits the excitation light by allowing a current and cooling water to flow. Reference numeral 11 denotes a horizontal gap spacer and is set so that an LD bar (not shown) that emits the excitation light and the guide plate 5 that transmits the excitation light are located at a given distance. Reference numeral 12 denotes a vertical gap spacer which is set so that the excitation light enters the center of thickness of the guide plate 5. Reference numerals 13 and 14 denote a bolt and a nut for fixing the LD package 6, the horizontal gap spacer 11, the vertical gap spacer 12 and the reflector 7 together, respectively.

Subsequently, the operation will be given.

FIG. 9 is a structural diagram showing a general solid-state laser oscillator. In this example, the LD package 6 which is high in efficiency and compact is employed as the excitation section instead of the lamp. The excitation light outgoing from the LD package 6 (there are many cases in which a plurality of LD packages 6 are used in association with a laser output) passes through the guide plate 5 and excites the laser medium 3 through the flow tube 4 that constitutes a channel that cools the laser medium 3. The excitation light does not excite the laser medium 3 at once but excites the laser medium 3 by passing through the medium several times. For that reason, the reflector 7 is located around the laser medium 3 so as to efficiently take out the laser beam. A light quantum within the laser medium 3 is supplemented between the partial reflecting mirror 1 and the total reflecting mirror 2, and the laser beam 8 is emitted by a given excitation or more.

FIG. 10 also shows a method of guiding a light from the LD package 6 until the laser medium 3 is excited. The LD package 6 is formed of a diode and emits the excitation light from the LD bar by making a current flow from an LD package main body (not shown) to a sub-mount, the LD bar, a wire bonding and a cathode electrode (which are not shown). Also, in order to maintain the junction temperature of the LD bar at a given temperature or lower, cooling is conducted with cooling water. The excitation light passes through the guide plate 5 and excites the laser medium 3 through the flow tube 4 surrounded by the reflector 7 with a high efficiency. In this example, it is necessary to assemble the guide plate 5 and the LD bar of the excitation light outgoing section together with a given accuracy. For that reason, the horizontal spacer 11 is inserted so as to maintain a gap between the LD bar and the guide plate 5 at a given value, and the vertical spacer 12 is inserted so as to adjust the vertical position, to thereby enhance the light transmission efficiency.

Figure 11:
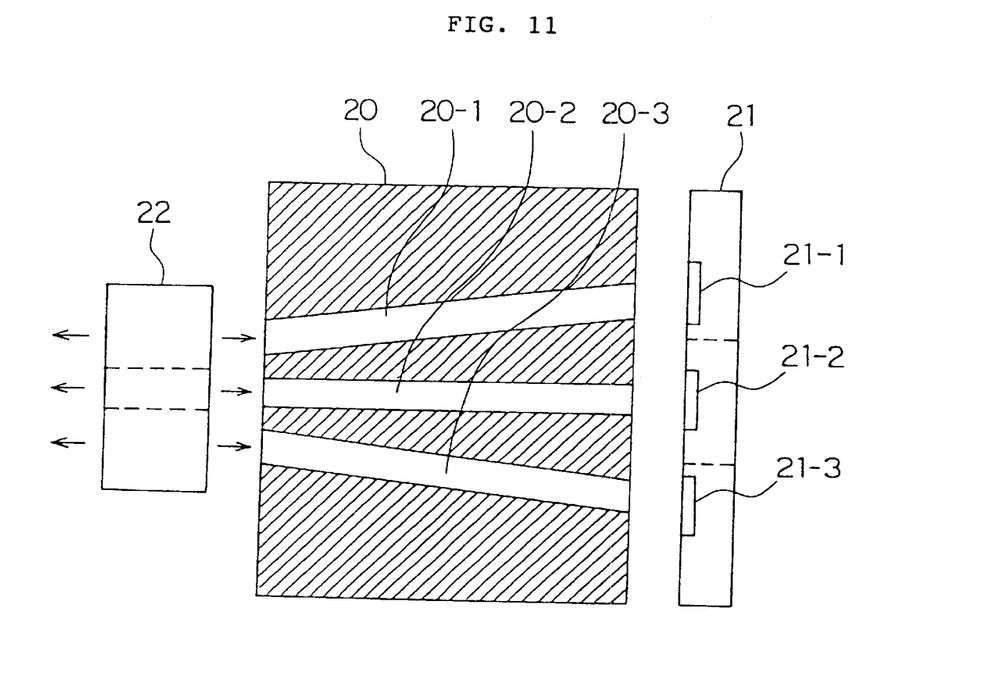
FIG. 11 is a structural diagram of a waveguide section used for conventional laser beam detection.
Figure 12:
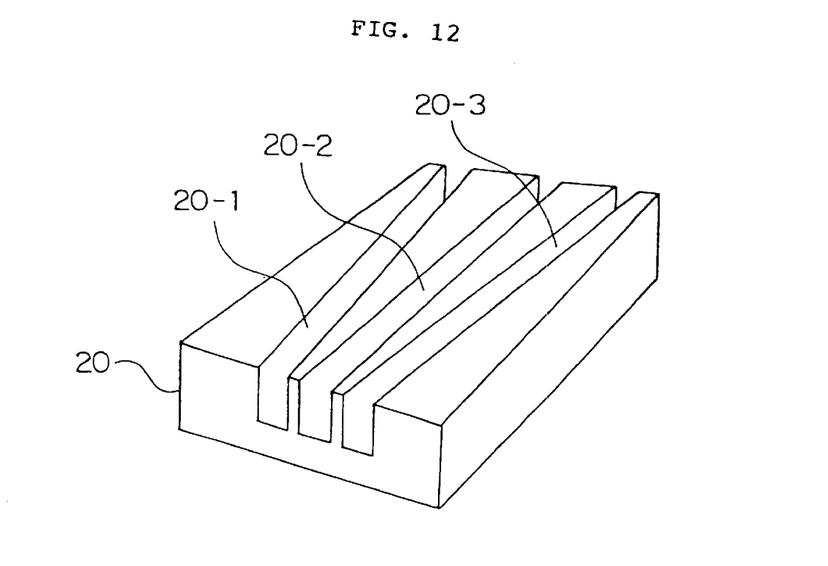
FIG. 12 is a perspective view of the waveguide section used for conventional laser beam detection.

On the other hand, as a light guide, there has been proposed a semiconductor laser device disclosed in Japanese Utility Model Unexamined Publication No. Sho 63-89273. FIGS. 11 and 12 show a structural diagram and a perspective view of a waveguide section used for detection of a laser beam according to an embodiment of that publication, respectively, and show a laser output stabilizing device which has been devised for optical pickup. Reference numeral 22 denotes a semiconductor laser that emits the light in both directions. Reference numeral 20 denotes a waveguide member having waveguide grooves 20-1, 20-2 and 20-3. Reference numeral 21 denotes a light receiving device having light receiving elements 21-1, 21-2 and 21-3. FIG. 12 is a birds-eye view of the waveguide member in which the respective LD lights are regulated by the waveguide grooves 20-1, 20-2 and 20-3 so as not to be interfered with each other and then guided lights up to the light receiving elements 21-1, 21-2 and 21-3.

The lights are for signal detection and emitted from the LD 22 in two directions, and one light is emitted to the light receiving device 21 and another light is used for reading, writing and erasing. The above LD 22 emitted in two directions is an LD of a multi-array (three functions in the figure). The stability of its output is very important for optical pickup, and the light is always detected by the light receiving device 21 to conduct output control. In order to make the waveguide member 20 compact, the array system is applied, and in order to surely separate the respective signals, the waveguide grooves 20-1, 20-2 and 20-3 are applied.

Incidentally, as shown in FIGS. 9 and 10, the structure using the guide plate 5 suffers from various problems, one of which is a cost problem. The guide plate 5 is very thin (0.3 to 0.7 mm) and upper and lower surfaces of the guide plate 5 must be subjected to micro-polishing for total reflection. Also, the outlet and inlet surfaces of the excitation light must be coated with an AR coat (coating for preventing reflection) after micro-polishing. The material of the guide plate 5 is high in refractive index, and a specific material low in absorption factor is required. In general, non-doped YAG or quartz is used which is very high in the costs.

Another problem is that assembling is difficult. The excitation light outgoing from the LD bar is about 1 micron, and the height of the LD package main body from a bottom surface thereof and the center of thickness of the guide plate 5 must be adjusted in height about several tens microns. Also, because a divergent angle is large, a gap between the outgoing surface of the LD bar and the guide plate 5 must be positioned in parallel, similarly, several tens microns. Because the height of the package main body of the LD bar from the lower surface thereof to a light emitting position varies, the horizontal spacer 11 and the vertical spacer 12 are actually selected so as to match its common difference and attached to the device. This maintains its transmission efficiency but the transmission efficiency is deteriorated if selection is in error.

Also, end surfaces of the guide plate 5 are subjected to the AR coating, resulting in such a problem that the coating is damaged by attachment of dusts and particles.

Further, still another problem is that three kinds of signals are separated by application of the waveguide grooves 20-1, 20-2 and 20-3 in Japanese Utility Model Unexamined Publication No. Sho 63-89273. In the case where light is guided to the waveguide grooves from the LD array 22, because the divergent angle of the LD array light is large, three lights cannot be sufficiently separated in this structure so as to be interfered with each other, and light is also leaked to the upper portion because of three walls, resulting in such a problem that the light transmission efficiency is deteriorated.

As described above, in the conventional device, because the guide plate 5 is used for LD light guide, there arise such problems that the costs are high, assembling is difficult, the transmission efficiency is deteriorated if adjustment is in error and a long-period reliability is low due to particles or the like. Also, there arises such problems that light separation cannot be sufficiently made because the waveguide grooves are applied but the light emitting section is located outside of the waveguide grooves, and the transmission efficiency is deteriorated because of three walls.

The present invention has been made in order to solve the above problems, and is to provide a semiconductor laser excitation solid-state laser device which conducts light transmission with a simple structure and a high efficiency and which is low in price, less varies in height, easy in assembling and high in reliability.

DISCLOSURE OF THE INVENTION

A semiconductor laser excitation solid-state laser device provided by the present invention is characterized by comprising: a partial reflecting mirror that partially transmits a laser beam and a total reflecting mirror that totally reflects the laser beam, which are disposed opposite to each other through a laser medium along a longitudinal direction of the laser medium; a semiconductor laser package that excites the laser medium; and a passage that guides an excitation light which is transmitted from a main body of the semiconductor laser package to the laser medium.

Also, as the passage that guides the excitation light, the structure of a total reflective light guide duct is applied.

Further, an inner surface of the total reflective light guide duct is provided with a reflection film having a high reflectance with respect to the excitation light.

Still further, there is structured such that a light outgoing section of the semiconductor laser package is inserted into the total reflective light guide duct.

Yet still further, the total reflective light guide duct comprises a U-shaped groove and a light guide duct cap having a structure which is inserted into the groove.

Yet still further, a gap between a semiconductor laser bar which forms the light outgoing section of the semiconductor laser package and the total reflective light guide duct is sealed with an airtight seal material.

Yet still further, the airtight seal material is made of a resin high in thixotropy.

Yet still further, said resin high in thixotropy is made of an epoxy resin.

Yet still further, a sub-mount and the semiconductor laser bar are joined together by soldering and mounted on the semiconductor laser package main body, the light guide duct cap is attached thereto, an insulating plate and a cathode electrode are fitted to one side of the semiconductor laser package main body, and a leading portion of the cathode electrode and the semiconductor laser bar are wire-bonded together.

Yet still further, the sub-mount, the semiconductor laser bar and the wire bonding portion are airtightly sealed with a protective cover.

Yet still further, the light guide duct cap and the protective cover are integrated together.

BEST MODES OF CARRYING OUT THE INVENTION

Embodiment 1

Figure 1:
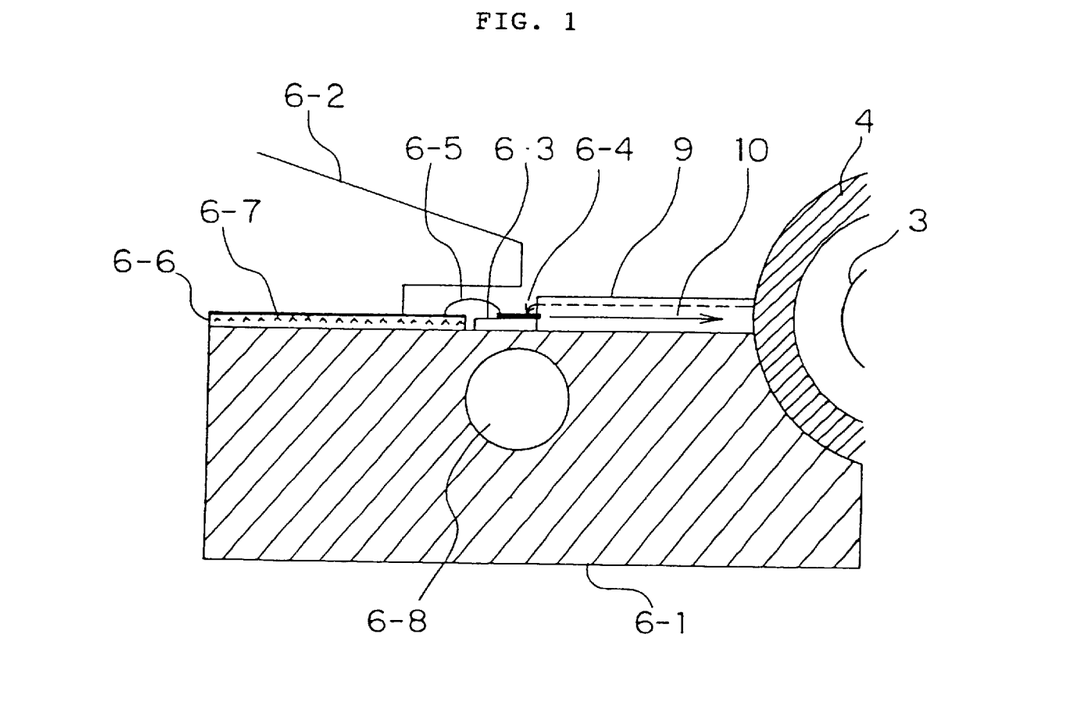
FIG. 1 is a cross-sectional view showing a laser medium exciting section of an LD excitation solid-state laser device in accordance with an embodiment 1 of the present invention.
Figure 2:
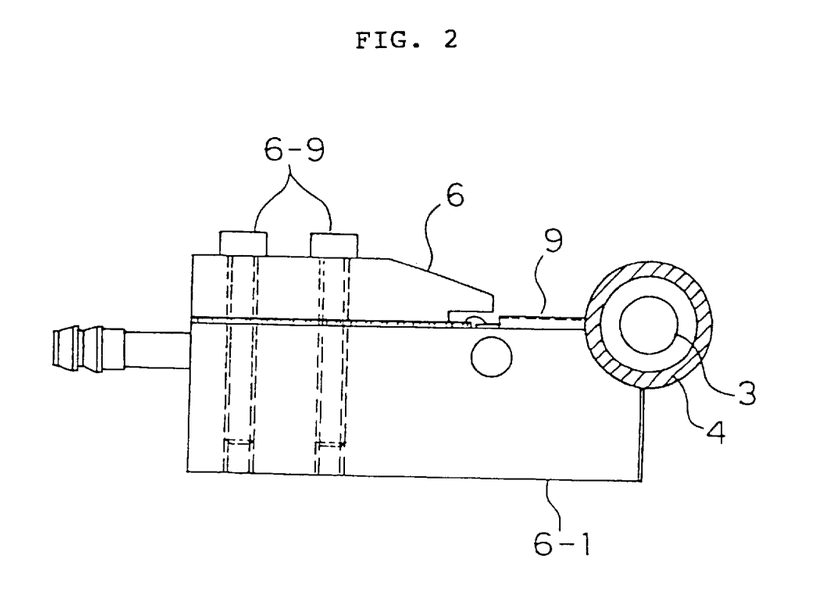
FIG. 2 is a partially enlarged view of a light guide duct section shown in FIG. 1 and a partially enlarged view showing that an outgoing section of an LD bar is inserted into a light guide duct.

FIG. 1 is a cross-sectional view showing a laser medium exciting section of an LD excitation solid-state laser device in accordance with an embodiment 1 of the present invention. This is a schematic structural diagram (a section of a laser medium in a radial direction) showing an excitation head of a laser oscillator as in the conventional example shown in FIG. 10. What is different from the conventional device resides in that not the guide plate 5 but a total reflective light guide duct 9 a center of which forms a hollow duct as a passage that guides the excitation light is applied in order to guide the excitation light 10 to the laser medium 3, and also a light outgoing section of an LD bar 6-4 in a light emitting section of the LD package 6 is inserted into the light guide duct 9. FIG. 2 is an enlarged view showing the vicinity of the light guide duct 9 section.

FIGS. 1 and 2 will be described. FIGS. 1 and 2 are greatly different from the conventional example in that the reflector 7 and the LD package main body 6-1 are formed of the same member, and the light guide duct 9 is newly mounted while the guide plate 5 is emitted.

Referring to those figures, reference numeral 6-1 denotes an LD package main body which also serves an anode electrode, a cooling member and a reflector. Reference numeral 6-2 denotes a cathode electrode which also serves as a protective cover of a wire bonding 6-5 and an LD bar 6-4. Reference numeral 6-3 denotes a sub-mount which spreads a heat of the LD bar 6-4 to transmit the heat and supplements the mechanical strength of the LD bar 6-4. Reference numeral 6-4 denotes the LD bar which emits only a wavelength necessary as the excitation light and the light emitting section is generally 1 micron and 10 mm in width. Reference numeral 6-5 denotes a gold wire formed by bonding several tens of thin wires in order to make a current uniformly flow. Reference numeral 6-6 denotes an insulating plate which insulates the anode electrode 6-1 and the cathode electrode 6-2 from each other. The insulating plate 6-6 is subjected to gold metallizing 6-7 so as to enable wire-bonding. Reference numeral 6-8 denotes a cooling channel which is generally disposed on the lowermost surface of the LD bar. Reference numeral 6-9 denotes a fastening bolt made of insulator which fixes the cathode electrode 6-2 and the package main body (anode electrode) 6-1 through the insulating plate 6-6.

Subsequently, the operation will be described. Upon the application of a voltage between the package main body (anode electrode) 6-1 and the cathode electrode 6-2, a current flows from the sub-mount 6-3 to the LD bar 6-4, flows from the wire bonding 6-5 to the gold metallizing 6-7 and flows into the cathode electrode 6-2. The LD bar 6-4 is formed of a diode and oscillates the laser excitation light at its junction section. The efficiency of the LD bar 6-4 is high to the degree of 30 to 40%, and the LD bar 6-4 can oscillate only a wavelength necessary for excitation of the solid-state laser. A solid-state laser device with a high efficiency can be manufactured with the use of the LD bar 6-4, and a beam with a high quality can be extracted because a useless light such as lamp excitation is not irradiated onto the laser medium 3.

Because the junction temperature is suppressed to a given value or less, water cooling is required. Water is made to flow in the cooling channel 6-8 and cooling water having a constant temperature flows therein so that oscillation can be made with stability. The excitation light 10 outgoing from the LD bar 6-4 passes through the flow tube 4 while being totally reflected within the light guide duct 9 and then excites the laser medium 3. In this situation, because the divergent angle of the outgoing light from the LD bar 6-4 is large, if the outgoing section is apart from the light guide duct, the light is leaked from that section, to thereby deteriorate the transmission efficiency. In order to eliminate that defect, the outgoing section of the LD bar 6-4 is inserted into the light guide duct 9, thereby making it possible to efficiently transmit the light. Also, the inner surface of the light guide duct 9 is subjected to coating so that it totally reflects the excitation light, and the transmission loss within the light guide duct 9 is suppressed to a minimum loss.

Embodiment 2

Figure 3:
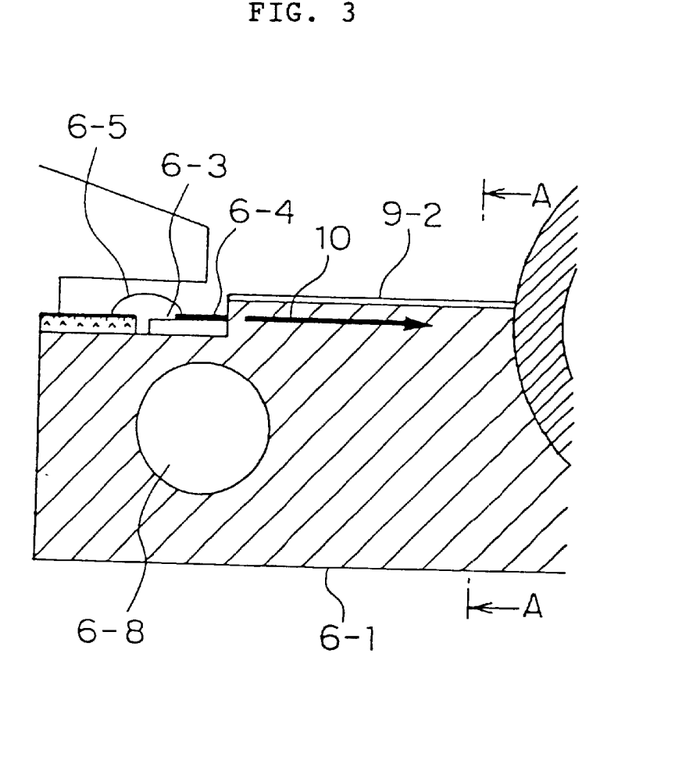
FIG. 3 is an enlarged view of the light guide duct section when the light guide duct is directly provided in an LD package main body in accordance with an embodiment 2 of the present invention.

An embodiment 2 will be described with reference to FIG. 3. The embodiment 2 shown in FIG. 3 is an improvement of the embodiment 1 by which the light guide duct 9 is provided directly in the package main body 6-1 through a mechanical working. Reference numeral 9-2 denotes a light guide duct cap. With the above structure, the positioning of the sub-mount 6-3 is facilitated, and the tolerance of the joining technique is increased.

Embodiment 3

Figure 4:
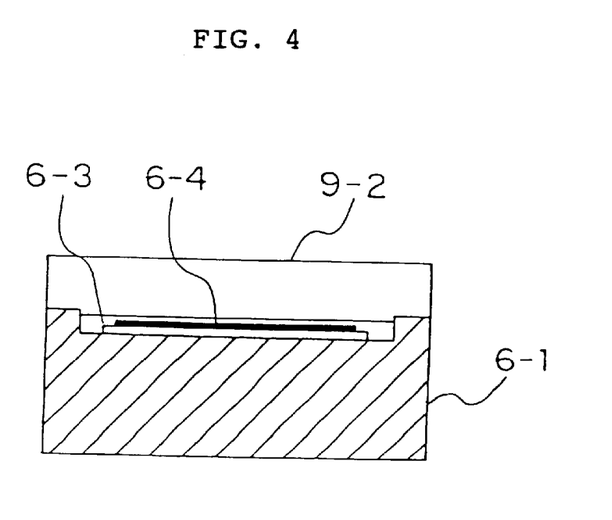
FIG. 4 is a conceptual view of a light guide duct made up of a U-shaped light guide duct and a light guide duct cap in accordance with an embodiment 3 of the present invention.

An embodiment 3 will be described with reference to FIG. 4. The embodiment 3 shown in FIG. 4 is that the light guide duct 9 is structured by a U-shaped groove and a light guide duct cap 9-2 having a structure which is inserted into the groove. This structure is advantageous in that the mounting of the sub-mount 6-3 and the LD bar 6-4 can be facilitated, and the coating on the inner surface of the duct which totally reflects the excitation light is facilitated.

Embodiment 4

Figure 5:
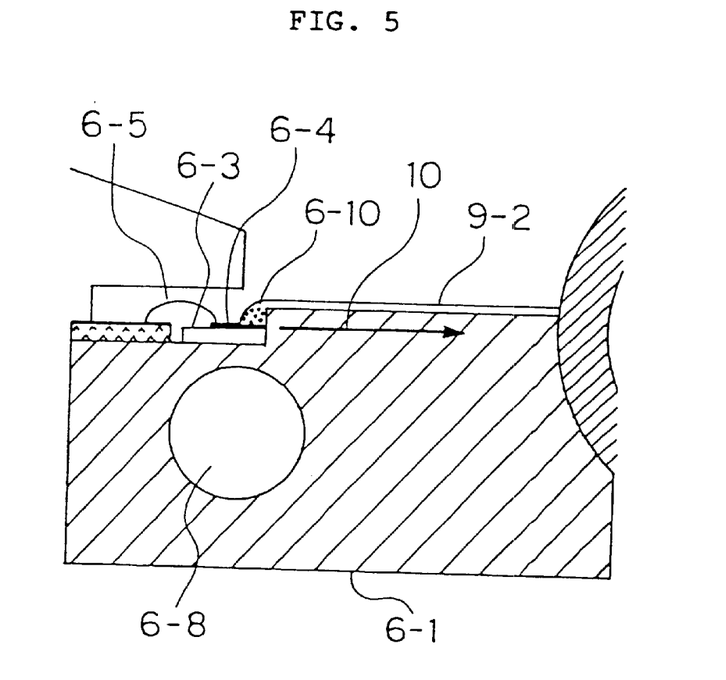
FIG. 5 is a diagram showing that a gap between an LD bar and a light guide duct is sealed by an airtight seal material high in thixotropy in accordance with an embodiment 4 of the present invention.

An embodiment 4 will be described with reference to FIG. 5. The embodiment 4 shown in FIG. 5 is an improvement of the embodiment 2 which is nearly the same as the embodiment shown in FIG. 3 and by which a gap produced between the LD bar 6-4 and the light guide duct 9 (light guide duct cap 9-2) is sealed with an airtight seal material 6-10. The outgoing end surfaces of the LD bar 6-4 are subjected to multi-layer coating, and if particles and dusts are stuck onto the outgoing end surfaces, the absorption of laser beam occurs, and the coating film is damaged. For that reason, it is important that the outgoing section is airtightly sealed with the airtight seal material 6-10.

This makes long-period stable oscillation possible. If the airtight seal material 6-10 is made of a material high in thixotropy (a property that the viscosity is low at the time of flowing but becomes high at the time of stopping), the seal material does not flow up to the outgoing end surfaces of the LD bar even if the gap is somewhat large, thereby enabling airtightly sealing. Also, the epoxy resin is generally applied as the sealing material high in thixotropy.

Embodiment 5

Figure 6:
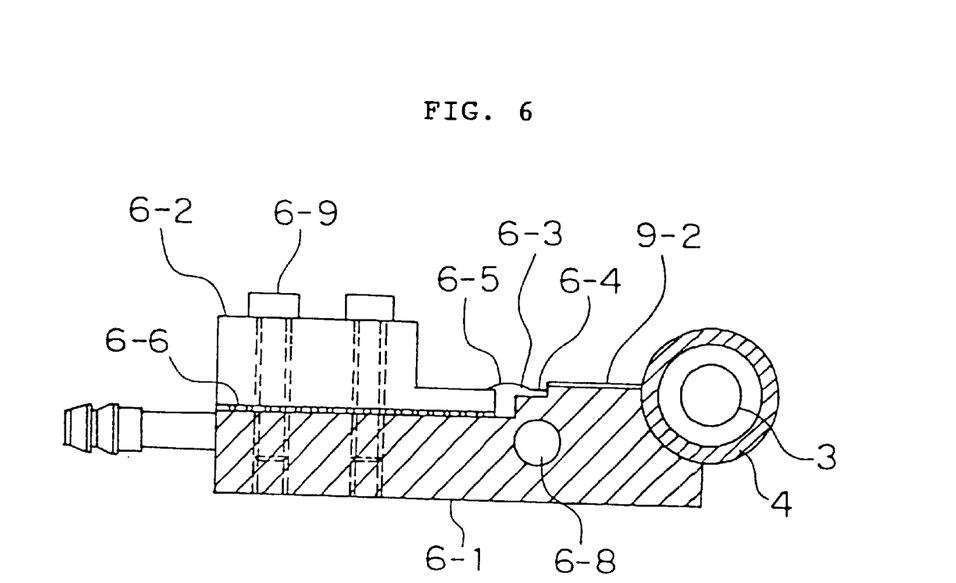
FIG. 6 is a structural view showing that a sub-mount, an LD bar and a light guide duct are mounted on an LD package main body, an insulating plate and a cathode electrode are fastened to one side of the LD package main body by a bolt and thereafter the LD bar and the cathode electrode are wire-bonded together in accordance with an embodiment 5 of the present invention.

An embodiment 5 will be described with reference to FIG. 6. The embodiment 5 shown in FIG. 6 is that the sub-mount 6-3 and the LD bar 6-4 are mounted on the package main body 6-1, and the light guide duct cap 9-2 is attached thereto. Also, the insulating plate 6-6 and the cathode electrode 6-2 are fitted to each other by the fastening bolt 6-9. Thereafter, a leading portion of the cathode electrode 6-2 and the LD bar 6-4 are wire-bonded together. The outgoing end of the LD bar 6-4 is inserted into the light guide duct. In this structure, the gold metallizing is unnecessary, and the fusion of the insulating plate 6-6 and the package main body 6-1 is unnecessary, to thereby reduce one joining process.

Embodiment 6

Figure 7:
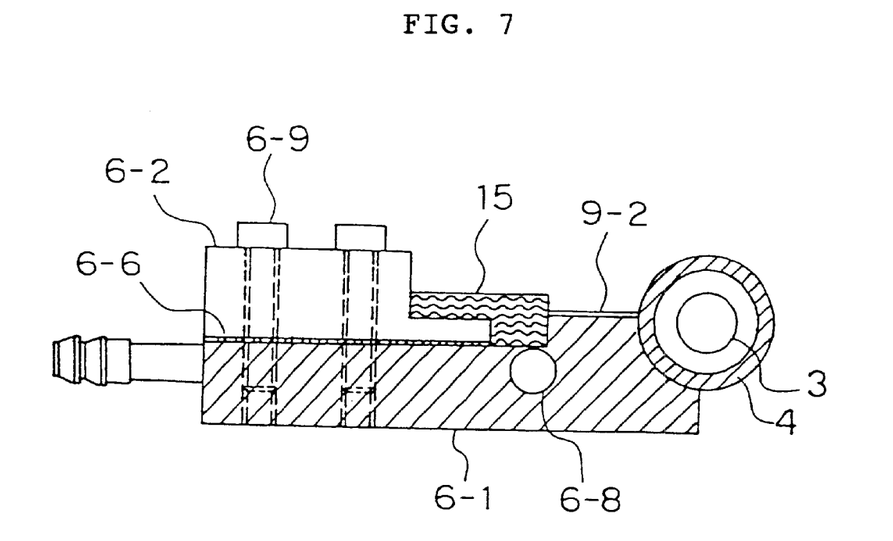
FIG. 7 is a structural diagram showing that the sub-mount, the LD bar and the wire bonding section shown in FIG. 6 are covered with a protective cover in accordance with an embodiment 6 of the present invention.

An embodiment 6 will be described with reference to FIG. 7. The embodiment 6 shown in FIG. 7 is an improvement of the embodiment 5, and this structure is that the LD bar 6-4, the sub-mount 6-3 and the wire bonding 6-5 are airtightly sealed with a protective cover 15 together. With this structure, in addition of the above-described airtightly sealing effect, the wire bonding 6-5 that conducts connection by a thin wire can be protected from an external force.

Embodiment 7

Figure 8:
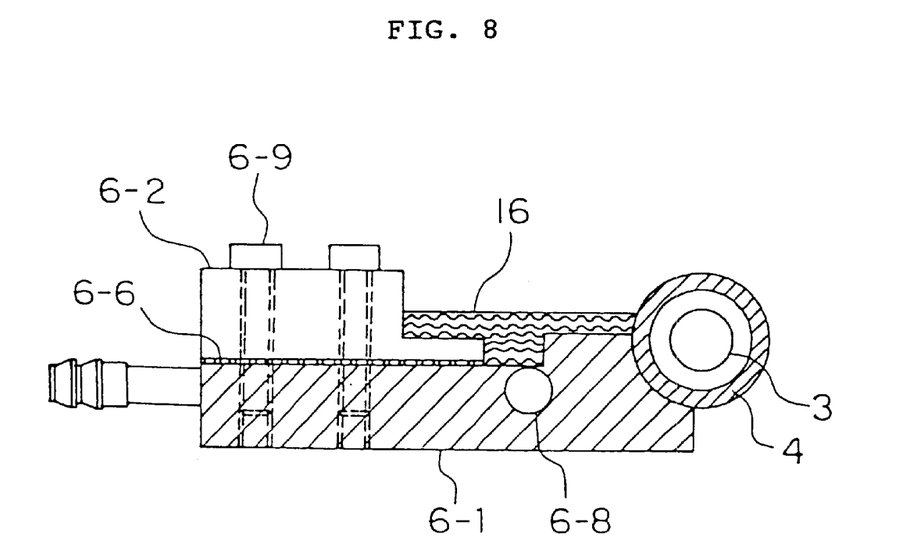
FIG. 8 is a schematic structural diagram showing that a light guide duct cap and a protective cover are integrated together in accordance with an embodiment 7 of the present invention.

An embodiment 7 will be described with reference to FIG. 8. The embodiment 7 shown in FIG. 8 is an improvement of the embodiment 6, in which the light guide duct cap 9-2 and the protective cover 15 are formed of the same member, and a cover 16 with a cap is applied. The light guide duct cap 9-2 is of the insertion structure which facilitates the attachment of the protective cover 15.

INDUSTRIAL APPLICABILITY

As described above, according to the present invention, the sub-mount 6-3, the LD bar 6-4 and the light guide duct 9 are mounted directly on the LD package main body 6-1, the outgoing section of the LD bar 6-4 is inserted into the light guide duct, and the light guide duct is formed of the U-shaped groove and the insertion cap. With this structure, there can be provided the LD excitation solid-state laser device which is easy in assembling, low in the costs, high in transmission efficiency and has the reliability for a long period of time.

What is claimed is:

1. A semiconductor laser excitation solid-state laser device characterized by comprising:

a partial reflector that partially transmits a laser beam and a total reflector that totally reflects said laser beam, which are disposed opposite to each other through a laser medium along a longitudinal direction of said laser medium, a semiconductor laser package that excites the laser medium, and a passage that guides an excitation light which is transmitted from a main body of said semiconductor laser package to the laser medium, wherein as said passage that guides the excitation light, the structure of a total reflective light guide duct is applied, a light outgoing section of said semiconductor laser package is inserted into said total reflective light guide duct, and a gap between a semiconductor laser bar which forms the light outgoing section of said semiconductor laser package and said total reflective light guide duct is sealed with an airtight seal material.

2. A semiconductor laser excitation solid-state laser device as claimed in claim 1, characterized in that an inner surface of said total reflective light guide duct is provided with a reflection film having a high reflectance with respect to the excitation light.

3. A semiconductor laser excitation solid-state laser device as claimed in claim 1, characterized in that said total reflective light guide duct comprises a U-shaped groove and a light guide duct cap having a structure which is inserted into the groove.

4. A semiconductor laser excitation solid-state laser device as claimed in claim 1, characterized in that said airtight seal material is made of a resin high in thixotropy.

5. A semiconductor laser excitation solid-state laser device as claimed in claim 4, characterized in that said resin high in thixotropy is made of an epoxy resin.

6. A semiconductor laser excitation solid-state laser device as claimed in claim 3, characterized in that a sub-mount and the semiconductor laser bar are joined together by soldering and mounted on said semiconductor laser package main body, said light guide duct cap is attached thereto, an insulating plate and a cathode electrode are fitted to one side of said semiconductor laser package main body, and a leading portion of said cathode electrode and said semiconductor laser bar are wire-bonded together.

7. A semiconductor laser excitation solid-state laser device as claimed in claim 6, characterized in that said sub-mount, said semiconductor laser bar and said wire bonding portion are airtightly sealed with a protective cover.

8. A semiconductor laser excitation solid-state laser device as claimed in claim 7, characterized in that said light guide duct cap and said protective cover are integrated together.

* * * * *